C. T. VOSS.
Improvement in Garbage and Slop Pails.
No. 125,860.          Patented April 16, 1872.
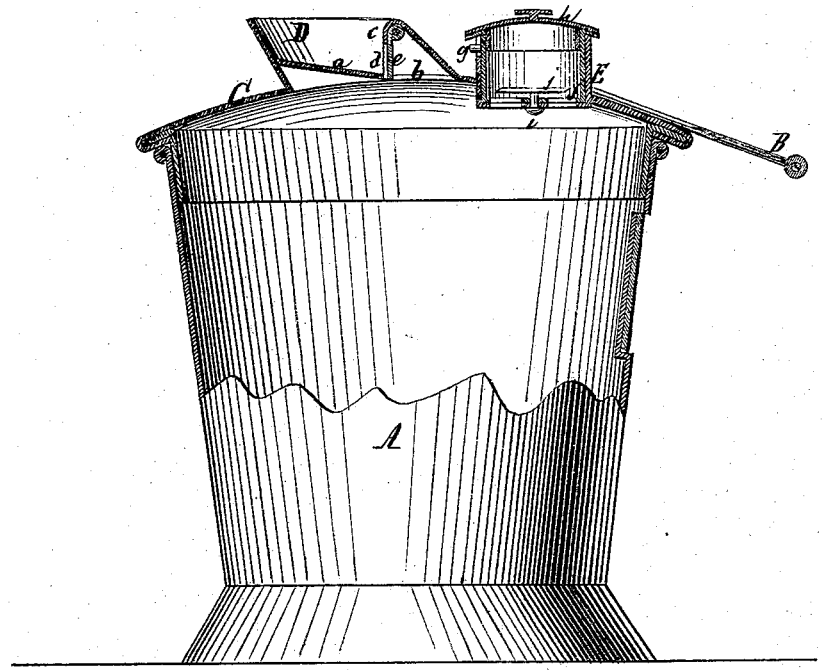
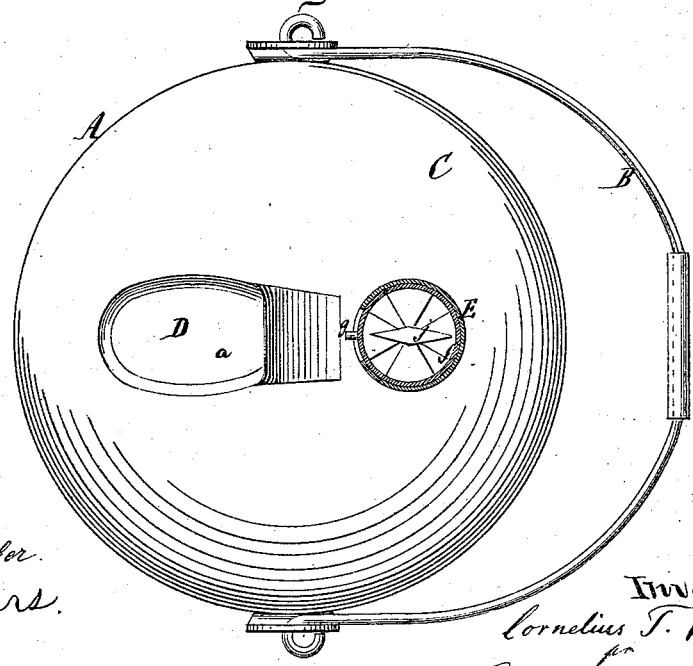

No. 125,860

UNITED STATES PATENT OFFICE.

CORNELIUS T. VOSS, OF STAPLETON, NEW YORK.

IMPROVEMENT IN GARBAGE AND SLOP PAILS.

Specification forming part of Letters Patent No. 125,860, dated April 16, 1872.

*To all whom it may concern:*

Be it known that I, CORNELIUS T. VOSS, of Stapleton, in the county of Richmond and State of New York, have invented a new and Improved Garbage and Slop Pail; and I do hereby declare the following to be a full, clear, and exact description thereof, which will enable those skilled in the art to make and use the same, reference being had to the accompanying drawing forming part of this specification, in which drawing—

Figure 1 represents a vertical section of this invention. Fig. 2 is a plan or top view of the same, partly in section.

Similar letters indicate corresponding parts.

This invention relates to a pail for receiving garbage and slops, the top or cover of said pail being provided with a hopper containing a self-closing valve for the admission of garbage or slops, and with a spout provided with a perforated bottom and with a revolving valve that serves to open and close the perforations in the bottom, said spout being intended to introduce chloride of lime or other disinfectants into the pail. With the bottom of the spout and its revolving valve is combined a cutter for the reduction of lumps of chloride of lime which may be thrown in the spout.

In the drawing, the letter A designates a pail, made of tinned sheet-iron, or other suitable material, and provided with a bail, B, for the purpose of carrying the same with convenience. In the top of the pail A is fitted a cover, C, and on this cover is secured a hopper, D, the bottom *a* of which inclines downward toward an aperture, *b*, in the cover, so that slops or garbage dumped in said hopper will readily find their way down into said pail. From the lower edge of the bottom *a* of the hopper rises the partition-wall *c*, which is perforated with an opening, *d*, and to which is attached a valve, *e*, that closes up against the opening *d* by its own inherent gravity; but it opens easily by any outward pressure brought to bear against it, so that if garbage or slops are dumped in the hopper they readily find their way down into the pail, and, after they have passed down, the valve *e* closes and prevents any unpleasant odors from escaping out of the pail. From the cover C also rises a spout, E, the bottom of which is perforated with a series of segmental openings, and into which is fitted a revolving valve, *f*, the cylindrical hollow shank of which fits into the spout while its body is perforated, so that by turning it the openings in the bottom of the spout can be opened or closed.

The revolving motion of the valve *f* is limited by a stop, *g*, projecting from the tubular shank of said valve through a slot in the side of the spout. This spout is intended for the introduction of chloride of lime or other disinfectants into the pail, and it is provided with a closely-fitting cover, *h*, so that, after the disinfecting material has been introduced into the spout and the cover *h* is put on, the odor of such disinfectants is prevented from escaping. By turning the valve *f* so as to open the aperture in the bottom of the spout, the disinfecting material is made to drop down into the pail.

In the center of the bottom of the spout is secured a pin, *i*, which supports a knife, *j*, so that when lumps of chloride of lime, for instance, are introduced into the spout and the valve *f* is revolved back and forth, said lumps will be broken up by the action of the knife.

By these means a pail for garbage or slops is obtained which prevents the escape of noxious gases or odors, and which allows of counteracting such gases or odors by the introduction of suitable chemicals.

What I claim as new, and desire to secure by Letters Patent, is—

1. The cover C, provided with the hopper D having the inclined bottom *a*, aperture *b*, and self-closing valve *e*, in combination with the pail A, substantially as and for the purpose set forth.

2. The cover C, provided with the spout E and revolving valve *f*, in combination with the pail A, as set forth.

3. The knife *j* in the spout E, in combination with the revolving valve *f*, substantially as described.

4. The arrangement of the hopper D with a self-closing valve, *e*, and the spout E with a revolving valve, *f*, in combination with each other and with the cover of a bail, A, substantially as set forth.

This specification signed by me this 10th day of October, 1871.

CORNELIUS T. VOSS.

Witnesses:
W. HAUFF,
E. F. KASTENHUBER.